UNITED STATES PATENT OFFICE.

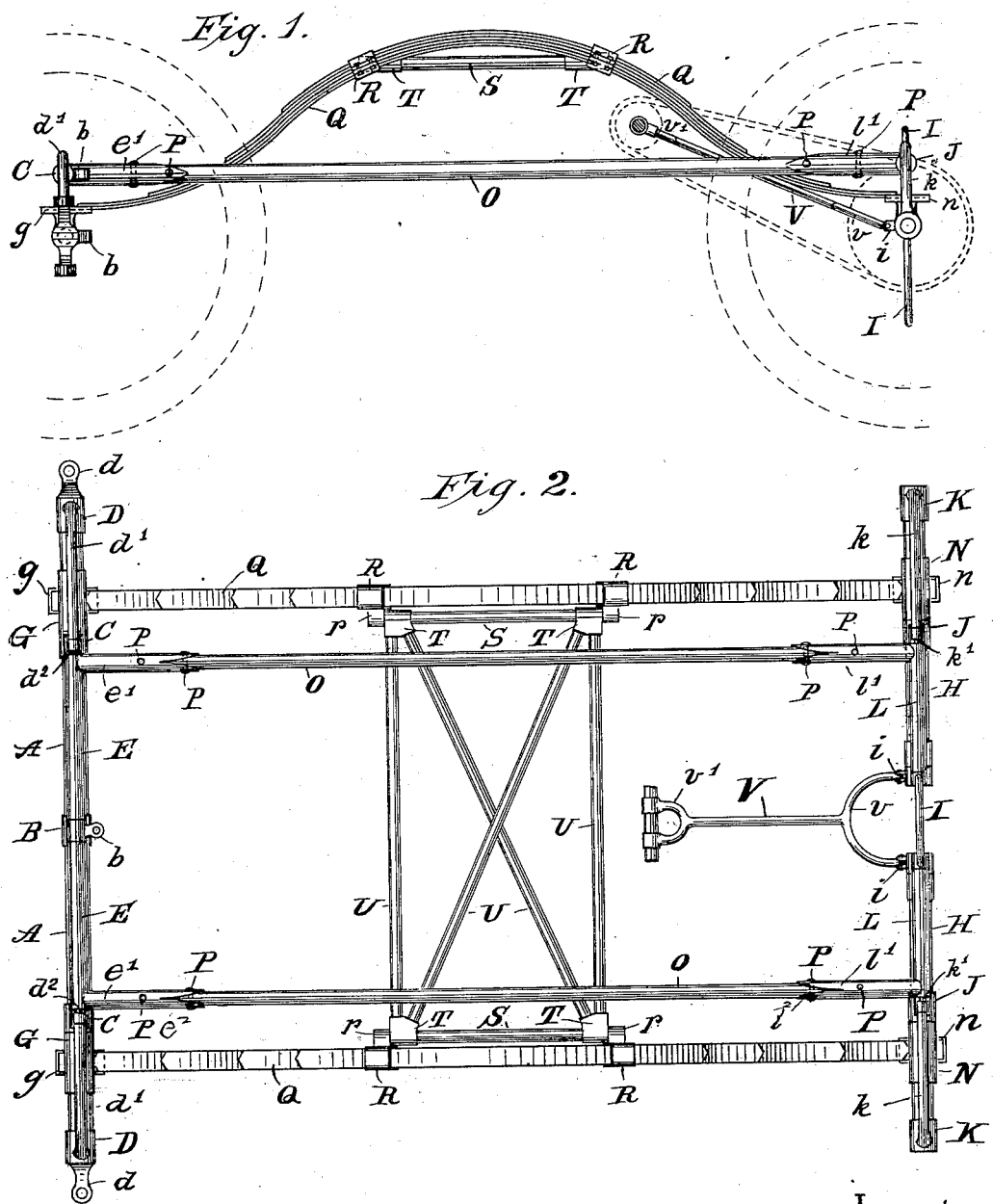

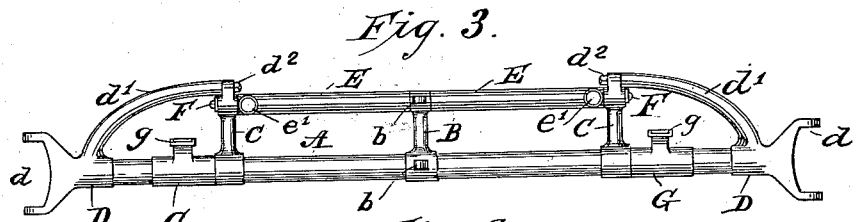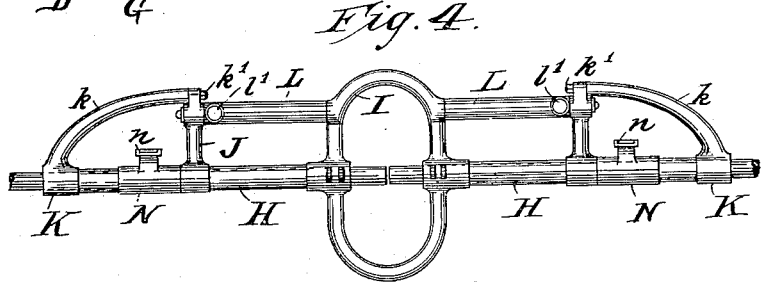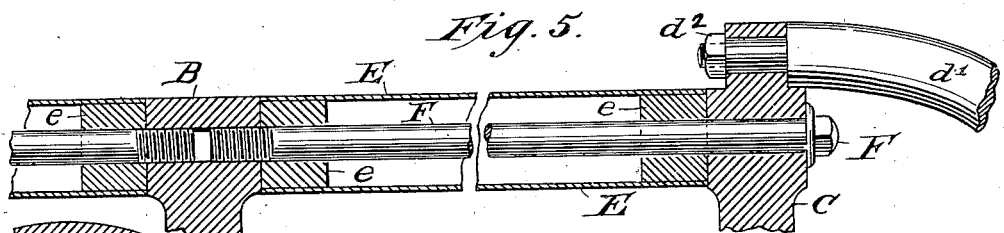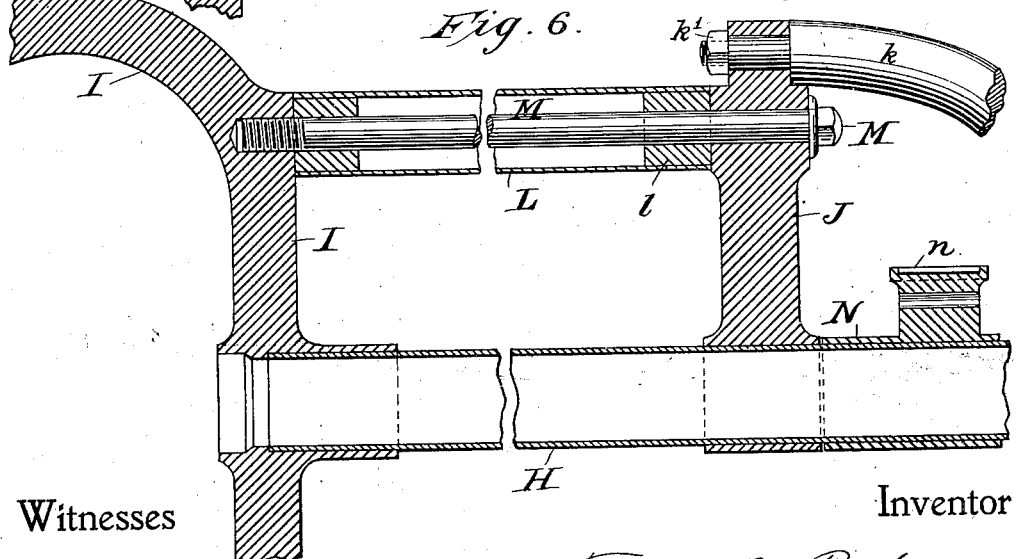

FRANK R. PARKER, OF PENACOOK, NEW HAMPSHIRE.

MOTOR-VEHICLE FRAME.

SPECIFICATION forming part of Letters Patent No. 662,298, dated November 20, 1900.

Application filed March 28, 1900. Serial No. 10,434. (No model.)

*To all whom it may concern:*

Be it known that I, FRANK R. PARKER, a citizen of the United States, residing at Penacook, in the county of Merrimac and State of New Hampshire, have invented certain new and useful Improvements in Motor-Vehicle Frames; and I do hereby declare the following to be a full, clear, and exact description of the invention, such as will enable others skilled in the art to which it appertains to make and use the same.

This invention relates to spring-frames for motor-vehicles which are designed to carry centrally-disposed driving mechanism, whereby both rear wheels may be driving-wheels. For light vehicles using but a single wheel as a driver a suitable frame may be constructed of very few parts, longitudinally-disposed springs connecting the axles forming the essential elements of such a frame; but when it is desired to propel such a machine with a pair of drivers the difficulties in construction are greatly increased, as the driving-gear should be attached to the shaft or axle at a point midway between the driving-wheels and said shaft or axle supported at that point. Hence the object of this invention is to provide spring-frames for vehicles with suitable trussed rocker-frames which support the axles and to provide means for maintaining said trussed rockers normally in a vertical position, thus preventing them from turning over, whereby a two-part driving-shaft may be used.

It is obvious that where half-elliptic springs connect the axles, as in the present construction, the distance between said axles must vary while the vehicle is in motion, or in accordance with the load or weight of the body, motor, &c., carried upon said springs. Thus when from any cause the springs are depressed they lengthen out, and by attaching the motor to the transverse frame which connects the central portion of the springs it will be seen that the driving-shaft of the motor must move vertically while the driving-shaft of the vehicle moves horizontally when said vehicle is in action, and hence by attaching the motor at the proper elevation a driving-chain connecting a sprocket on each of said shafts would be maintained at practically a uniform tension without regard to the load on the vehicle-springs.

The invention consists, broadly, in supporting the axles in rocker-frames, the upper portions of which are connected by light longitudinally-disposed bars composed of wood, the lower portions of said rockers being connected to the ends of suitable parallel half-elliptic springs, said springs being connected centrally by a rigid frame adapted to support the body and other attachments of said vehicle, as fully set forth in the following specification and claims and clearly illustrated in the drawings accompanying and forming a part of the same, of which—

Figure 1 is a side elevation of my improved spring-frame for automobiles, showing the wheels and driving-gear in dotted lines, Fig. 2 being a general plan view of said frame. Fig. 3 is an elevation showing the forward rocker-frame. Fig. 4 is an elevation showing the rear rocker-frame. Fig. 5 is a sectional elevation showing a portion of the forward rocker-frame on an enlarged scale, Fig. 6 being an enlarged sectional elevation showing a portion of the rear rocker-frame.

Similar reference-letters designate like parts in all the views.

Each rocker-frame constitutes a trussed support for an axle, the forward rocker-frame comprising a bar or tube A, to which are brazed the centrally-disposed arm B, the arms C, and the end irons D, upon each of which latter are formed a vertically-disposed yoke $d$ and an upturned curved arm $d'$, the free end of each arm $d'$ being provided with a reduced threaded portion adapted to pass through a perforation near the top of either arm C and to be secured thereto by a threaded nut $d^2$, and a pair of tubes E, extending from the top of the arm B to either arm C and supported in a position parallel with the bar or tube A each by a bolt F, said bolt passing loosely through a perforation in either arm C and threaded to a perforation in and near the top of the arm B, as seen best in Fig. 5, and between each arm C and end iron D is loosely mounted upon the bar or tube A the sleeve G, upon which is formed a flanged plate $g$, to which an end of either vehicle-spring may be bolted.

In order that the tubes E may be of larger diameter than the bolts F and yet bear thereon, plugs e are brazed within the ends of said tubes, said plugs being perforated for the reception of said bolts. These tubes E are also provided with rigidly-connected reaches or sockets e' for the reception of one end of the bars which connect one rocker-frame with the other.

The construction of the rear rocker-frame is similar to that of the other, the only necessity for varying the construction being that it must carry the driving-shaft, thereby requiring a centrally-disposed yoke within which to mount a driving gear or sprocket upon said shaft, and said rear rocker-frame comprises the tube H, to which are brazed the centrally-disposed yoke I, the arms J, and the end irons K, provided each with an upwardly-disposed curved arm $k$, the free end of each of said curved arms being with a reduced threaded portion adapted to pass through a perforation near the top of either arm J and to be secured thereto by a threaded nut $k'$ and a pair of tubes L, supported between the yoke I and the arms J in a position parallel with the tubes H by suitable bolts M, said bolts passing loosely through a perforation in either arm J and threaded to a perforation in opposite sides of and near the top of the yoke I, as seen best in Fig. 6, and between each arm J and the end irons K is loosely mounted upon the tubes H a sleeve N, upon which is formed a flanged plate $n$, to which one end of either vehicle-spring may be bolted. The tubes L are provided with plugs $l$, brazed within their ends, said plugs being perforated, as are the plugs $e$ of the tubes E, for the reception of the bolts M, and said tubes are also provided with brazed reaches or sockets $l'$, which are connected with the sockets $e'$ of the forward rocker-frame by suitable wooden bars O, the ends of which enter the sockets of either rocker-frame and are secured thereto by a pair of rivets P, passed through the sockets and wood, one rivet being at right angles with the other. The ends of the sockets $e'$ and $l'$ may be bifurcated, as seen at $e^2$ $l^2$, respectively, so as to lessen the liability of the bars O to become broken at the end of said sockets. These wooden bars O are preferably formed of hickory or other similar hard wood possessing like elasticity and toughness, and it may be here stated that the connection of the rear and forward rocker-frames by bars formed of some tough wood is a very important element in the construction of frames for automobiles in which no provision is made for a vertical rocking motion of the axles independently of each other, as it is obvious that the tubes forming the longitudinal side portions of such a frame, which are usually secured by brazed connections to the transverse end portions, must be subjected to a twisting strain whenever either forward wheel encounters any obstacle or depression in its path, said twisting strain being more or less severe in accordance with the vertical motion of a wheel under such circumstances and more frequently furnishing the cause for repairs than all other causes combined.

Q represents the half-elliptic springs having their ends secured forward and rear to the flanged plates $g$ $n$, respectively, of the sleeves G N, said springs being provided centrally with clamps R, having ears $r$, within which are secured the ends of either rod S, upon each of which are loosely mounted forgings or steel castings T, provided with sockets to which are brazed the ends of suitable transverse bars or tubes U, forming a support for the body and motor of the vehicle.

V represents a brace or equalizer, the ends of which terminate in the yokes $v$ $v'$, the former being pivotally connected to the ears $i$ at opposite sides of the yoke I and the latter being mounted upon the crank-shaft W of any motor with which the carriage may be fitted, a portion of said shaft W being shown in Figs. 1 and 2, the object of the brace V being to maintain an equal distance between said crank-shaft and the driving-shaft of the vehicle when the latter may be passing over uneven surfaces of road or when it is subjected to various loads.

The arm B is provided with ears or lateral projections $b$, one near each end, said ears being perforated for the reception of a steering-lever, said ears being shown in Figs. 1, 2, and 3.

Having described my invention, what I claim is—

1. In a frame for automobiles, a pair of transverse rocker-frames carrying the axles, a pair of half-elliptic springs connecting the lower portion of said rocker-frames one to the other, and a pair of wooden bars connecting the upper portion of said rocker-frames whereby said axles may move horizontally.

2. In a frame for automobiles, a pair of transverse trussed frames carrying the axles, a pair of half-elliptic springs connecting the lower portion of said trussed frames, and a pair of wooden bars having their ends pivotally connected to the upper portion of said trussed frames.

3. In a frame for automobiles, a pair of transverse trussed frames carrying the axles, a pair of half-elliptic springs having their ends pivotally connected to the lower portion of said trussed frames, and a pair of wooden bars having their ends loosely connected to the upper portion of said trussed frames.

4. A frame for automobiles comprising, a pair of transverse trussed frames supporting the axles, a pair of half-elliptic springs having their central portions connected by a suitable frame, the said frame, a pair of wooden bars disposed parallel with said springs, two pair of horizontally-oscillating sleeves mounted one pair upon the upper and one pair upon the lower portion of each trussed frame, and means for rigidly connecting the ends of said wooden bars to the upper oscillating sleeves and the ends of said springs to the lower oscillating sleeves of said trussed frames.

5. A spring-frame for automobiles comprising, rocker-frames for supporting the axles, parallel wooden side bars having their ends pivotally connected to the upper portions of said rockers, parallel side springs having their ends pivotally connected to the lower portions of said rockers, and a suitable transverse frame loosely connecting the central portions of said springs.

6. A spring-frame for automobiles comprising, a transverse trussed member adapted to carry the forward axles and steering-lever, a transverse trussed member adapted to carry the rear axles and provided with a central yoke within which the driving sprocket or gear may be attached to the axles, parallel wooden side bars having their ends loosely coupled to the upper portion and parallel half-elliptic side springs having their ends loosely coupled to the lower portion of said transverse trussed members, and a transverse frame adapted to support the body and motor of the vehicle and being loosely attached to the central portions of said springs.

7. In a spring-frame for automobiles, a transverse trussed frame adapted to carry the forward wheels and comprising a straight bar or tube, a centrally-disposed vertical arm and a pair of vertical arms having two perforations at their top, said arms being located one near either end of and all three arms being brazed to said straight bar or tube, a pair of oscillating sleeves located one near either end of said straight tube outside of said vertical arms and provided each with a flanged plate, a pair of curved arms one end of each being brazed to the outer end of said straight tube and their opposite end terminating in a reduced threaded portion secured within the upper perforation of either outer vertical arm by a threaded nut, a pair of bolts passing through the lower perforation of either of said outside vertical arms and threaded to the central vertical arm, and a pair of oscillating sleeves mounted one upon each of said bolts and provided each with a reach or socket projecting at right angles therefrom, substantially for the purpose set forth.

8. In a spring-frame for automobiles, a transverse trussed frame adapted to carry the rear or driving axle and comprising a pair of tubes securely brazed to and projecting from opposite sides of a vertically-elongated yoke, the said yoke, a pair of vertically-disposed arms brazed one to each of said tubes, the arms provided each with two perforations near their outer end, a pair of curved arms securely brazed at one end to the outer end of either tube and having at their opposite end a reduced threaded portion fitting the upper perforation of either vertical arm and secured thereto by a threaded nut, a pair of oscillating sleeves mounted upon said tubes outside of said vertical arms and provided each with a flanged plate, a pair of bolts passing through the lower perforation of either of said vertical arms and threaded to opposite sides of said yoke, and a pair of oscillating sleeves mounted one upon each of said bolts and provided each with a reach or socket projecting at right angles therefrom, substantially for the purpose set forth.

9. In a frame for automobiles, a pair of transverse trussed frames one adapted to carry the forward wheels and the other the driving-wheels, a pair of wooden bars having their ends loosely coupled to the top of either trussed frame, a pair of half-elliptic springs having their ends loosely coupled to the bottom of either trussed frame, a transverse frame loosely connected to the central portion of said springs for supporting the vehicle-body and its motor, and an equalizer or brace adapted to be pivotally connected at one end to the crank-shaft of a motor and at the opposite end to the lower portion of the trussed frame carrying the driving-wheels.

In testimony whereof I affix my signature in presence of two witnesses.

FRANK R. PARKER.

Witnesses:
J. B. THURSTON,
EMILE H. TARDIVEL.